Aug. 5, 1969

T. R. KELLEY 3,459,957

VOLTAGE REGULATOR CIRCUIT

Filed July 19, 1967

INVENTOR.
THOMAS RAY KELLEY

OSTROLENK, FABER, GERB & SOFFEN
ATTORNEYS

Aug. 5, 1969
T. R. KELLEY
3,459,957
VOLTAGE REGULATOR CIRCUIT
Filed July 19, 1967
2 Sheets-Sheet 2
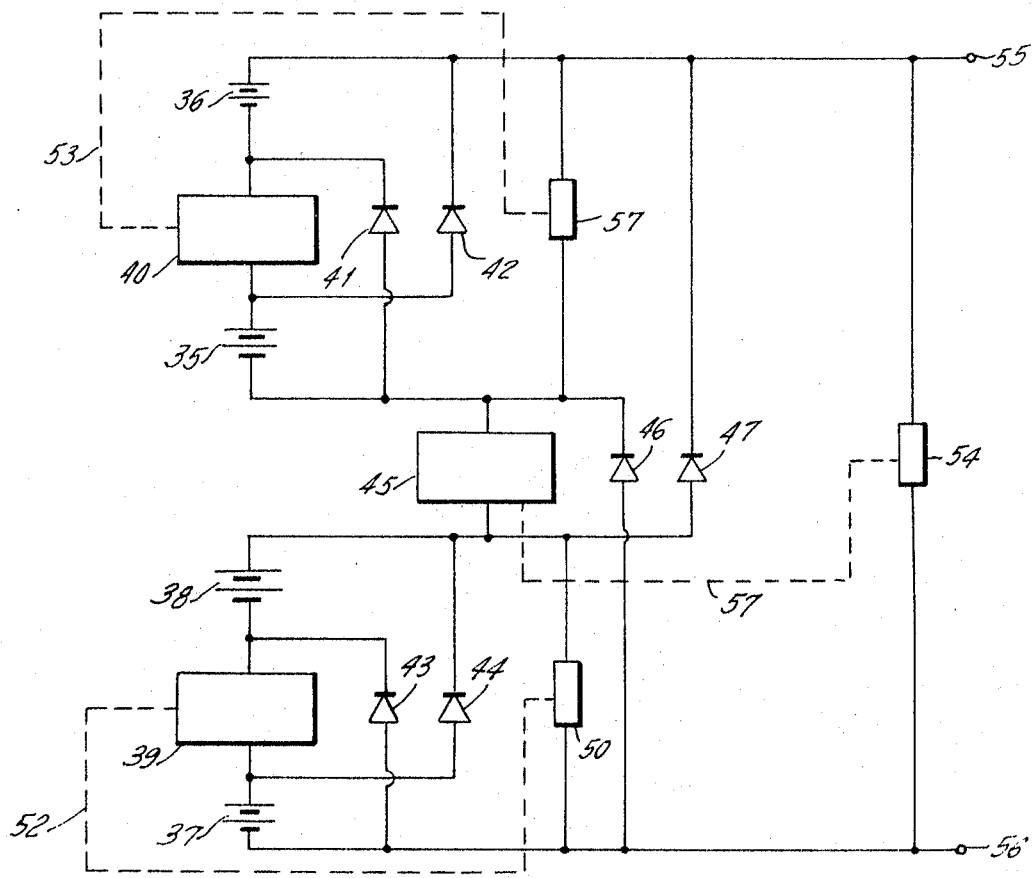
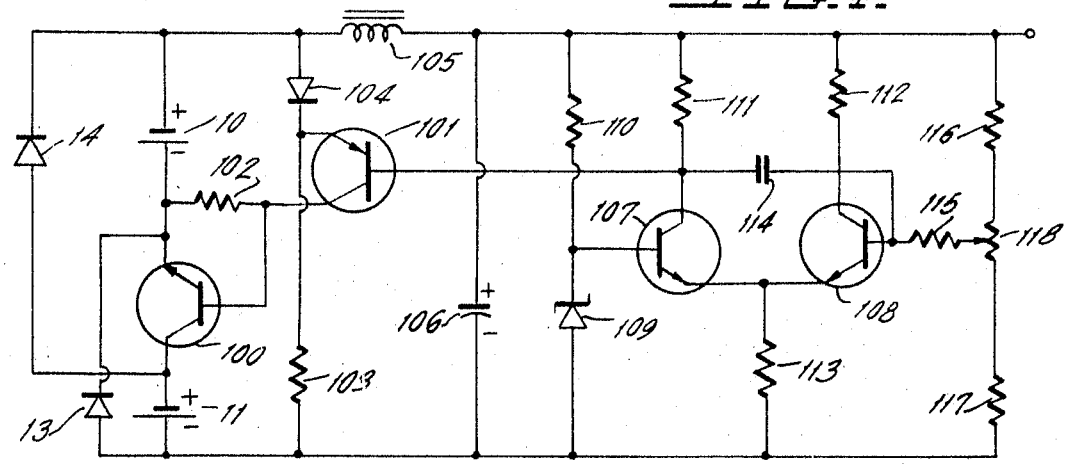

United States Patent Office 3,459,957
Patented Aug. 5, 1969

3,459,957
VOLTAGE REGULATOR CIRCUIT
Thomas Ray Kelley, Audubon, N.J., assignor, by mesne assignments, to I-T-E Imperial Corporation, Philadelphia, Pa., a corporation of Delaware
Filed July 19, 1967, Ser. No. 654,617
Int. Cl. H02m 3/08
U.S. Cl. 307—71                          5 Claims

ABSTRACT OF THE DISCLOSURE

This invention relates to a novel voltage regulator circuit for regulating the output voltage of a plurality of D-C power sources, and more specifically relates to a novel voltage regulator circuit for a plurality of D-C power sources which synchronously rearranges the power sources from series to parallel circuit connections to obtain a desired average D-C voltage output.

---

This invention is an improvement of the voltage regulator circuit shown in my copending application Ser. No. 451,402, filed Apr. 28, 1965, now Patent 3,384,758 issued May 21, 1968 entitled "Regulation System for Multiple D-C Sources," and assigned to the assignee of the instant invention. The voltage output available from D-C power sources such as batteries, fuel cells, and the like, is not constant and can vary considerably during the operating life of the devices due to discharge conditions, temperature changes, and the like. There are, however, many applications where it is desirable or necessary that the output voltage of such D-C power sources be constant. Many voltage regulator systems are available for this purpose, where, however, such systems commonly dissipate considerable amounts of power while performing their regulation function.

The principle of the present invention is to synchronously switch a plurality of D-C power sources between series and parallel connections, obtaining some desired average output voltage which is controlled by varying the length of time that the sources are connected in their series mode. By arranging the regulator circuit in this manner, the regulator will not dissipate power, and will distribute the load evenly between all D-C power units making up the source, regardless of their relative state of discharge. Moreover, reliability of the source is improved since the regulator will automatically decrease or remove load from any cell not producing its normal voltage even though it can still contribute to the momentary series voltages while the cells are connected in series. Note that when a defective cell will return to its normal voltage for any reason, it will automatically resume its share of the total load during parallel operation.

The present arrangement is an improvement over the arrangement shown in my above noted copending application in that the form factor of the cell currents (the ratio of RMS current to average current) is better than where the cells are permanently connected with a chopper circuit being used to reduce output voltage to the desired average value. Thus, the present arrangement reduces power losses and heating within the various D-C voltage cells and reduces filter requirements.

As will be seen hereinafter, the novel structure of the invention uses an extremely simple circuit requiring only two diodes for two respective batteries which are being alternately connected in series-parallel relation and a single switching device which obtains this switching characteristic.

Moreover, a plurality of such assemblages of two rectifying elements, a switching device and two D-C voltage sources, can be cascaded with one another to permit use of a larger number of cells and to minimize output ripple.

Accordingly, a primary object of this invention is to provide a novel voltage regulator for a plurality of D-C sources which does not dissipate power.

Another object of this invention is to provide a novel D-C voltage regulator for a plurality of D-C sources which will distribute load evenly between all cells within the source according to their ability to contribute load current.

Still a further object of this invention is to provide a novel D-C voltage regulator for a plurality of D-C sources which will automatically adjust the load required of any cell not producing its normal output.

A still further object of this invention is to provide a novel D-C voltage regulator for a plurality of D-C voltage sources which will automatically isolate a single defective voltage source without impairing the output of the system.

These and other objects of this invention will become apparent from the following description when taken in connection with the drawings, in which.

Figure 1:
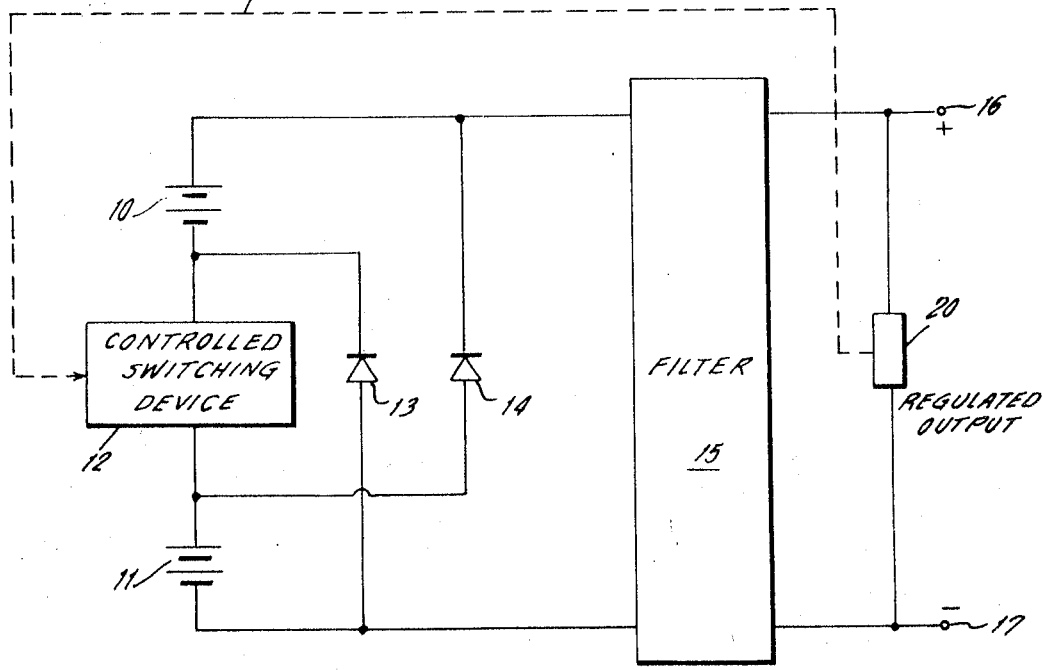
FIGURE 1 illustrates in block diagram form the basic circuit in accordance with the present invention.

FIGURE 3 schematically illustrates the manner in which two basic circuits of the type shown in FIGURE 1 can be cascaded to permit use of a larger number of D-C sources in the voltage generator system.

FIGURE 4 is a circuit diagram illustrating components which could be used for the block diagram of FIGURE 1.

Referring first to FIGURE 1, I have illustrated therein the basic circuit of the invention which provides the automatic regulation of the output of two batteries 10 and 11 by synchronously connecting the batteries in series or parallel circuit configurations through a controlled switching device 12. The D-C voltage sources 10 and 11 are illustrated herein as batteries, although it will be apparent to those skilled in the art that any suitable D-C source could be used.

A diode 13 is then connected in closed series relation with switching device 12 and source 11 while diode 14 is connected in closed series relation with switching device 12 and source 10. When switching device 12 is open, source 10 and diode 13 are connected in parallel with source 11 and diode 14, with diodes 13 and 14 connected in a direction to permit flow of current from the now parallel connected batteries 10 and 11. Thus, the output voltage connected to filter 15 will be the parallel connected voltages of batteries 10 and 11. This voltage is then applied to the output terminals 16 and 17 which can be connected to some suitable load.

However, when switch 12 is closed, the anode of diode 13 is connected to the cathode of diode 14, whereupon batteries 10 and 11 are connected in series with one another.

This circuit extends from terminal 17, battery 11, switch 12, battery 10 to the positive terminal 16. Note that the closing of switch 12 will effectively short circuit diode 14 insofar as current from battery 11 is concerned and will effective short circuit diode 13 insofar as current from battery 10 is concerned. Therefore, the two batteries 10 and 11 are in series.

The controlled switching device 12 is then controlled by a suitable sensing circuit 20 connected across terminals 16 and 17 which, as illustrated by dotted line 21, controls the length of time which the synchronously closed controlled switching device remains closed.

Figure 2:
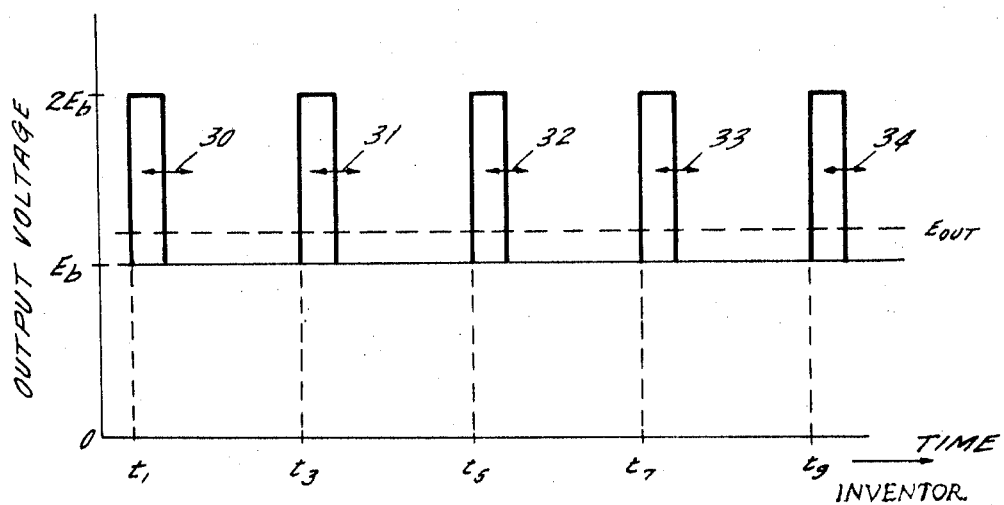
FIGURE 2 illustrates voltage as a function of time to illustrate the operation of FIGURE 1.

This operation is best understood from FIGURE 2 which shows the voltage connected to filter 15 from the batteries 10 and 11 in FIGURE 1. The voltage $E_b$ is the output voltage of either of batteries 10 or 11 by themselves. So long as the switch 12 is open, the voltage connected to filter 15 will be the parallel connected voltage $E_b$ of both batteries 10 and 11.

The switch device 12, however, is controlled so that it is closed in a synchronous manner at times $t_1$, $t_3$, $t_5$, $t_7$ and $t_9$ in FIGURE 2 where, for example, a repetitive frequency of 400 cycles per second could be used to close the switch 12.

The length of time that switch 12 remains closed is determined by the amount of control that is necessary on the output voltage applied to filter 15. That is, the regulated output voltage desired is the value $E_{out}$, shown in dotted lines in FIGURE 2. This desired output voltage is higher than the voltage of any single battery 10 or 11 which is the lower value $E_b$. However, once the switch 12 is closed, the voltage applied to filter 15 is the voltage $2E_b$ of FIGURE 2, since batteries 10 and 11 are now in series. By now controlling the length of time that the switch remains closed and the batteries remain in their series connection, it is possible to adjust the average output voltage applied to filter 15 in any desired manner.

This control feature is schematically illustrated in FIGURE 2 by the arrows 30, 31, 32, 33 and 34 on the trailing edge of the double voltage peaks which mark the time at which the switch is reopened.

Accordingly, by setting the voltage sensing circuit 20 to deliver an output error signal related to the difference between the measured output voltage in terminals 16 and 17 and the desired voltage, the switching device 12 can be controlled to vary the point at which switch 12 reopens, thereby to control the average output voltage. Note that this is done without the dissipation of battery power.

Moreover, if one battery is discharged more than the other, this change in battery condition can be easily compensated for to obtain a constant average output voltage by merely keeping the two batteries in series for a longer length of time.

The basic circuit of FIGURE 1 illustrates the manner in which two batteries can be interconnected with respect to one another.

FIGURE 3 illustrates the manner in which a plurality of circuits of this type could be cascaded to permit the use of any desired number of batteries. In FIGURE 3, the cascaded circuits are operated in a phase shifted manner to improve the ripple characteristics of the output voltage. That is to say, their double voltage spikes occur at different times in a time diagram such as that of FIGURE 2.

Referring now to FIGURE 3, there is illustrated two initial subassemblies having respective voltage sources 35–36 and 37–38 which are controlled by switches 39 and 40, respectively. Suitable diodes 41–42 and 43–44 are used in combination with the upper and lower circuits, respectively, in FIGURE 3. Each of the upper and lower circuits will operate in a manner identical to that described for FIGURE 1.

The output voltages of these circuits, however, which in themselves have some particular average value, are then combined by means of the controlled switch 45 in combination with diodes 46 and 47.

The control for switches 39 and 40 is then obtained from voltage sensing devices 50 and 51, respectively, as illustrated by dotted lines 52 and 53, respectively, to insure that the average output of the upper and lower circuits is at some desired value. Thereafter, a main output voltage measuring monitor 54 connected between the output terminals 55 and 56 then controls the main switch 45, as illustrated by dotted line 57. Clearly, additional cascading stages could be added in FIGURE 3, if it is desired to use more voltage source in the supply system.

Referring next to FIGURE 4, there is illustrated therein a circuit similar to that of FIGURE 1 wherein similar numerals identify components similar to those of FIGURE 1. The switching circuit of FIGURE 4, which was shown in FIGURE 1 as block 12 can be composed of suitable transistors 100 and 101 with suitable bias resistors 102 and 103. A diode 104 provides a source of D-C operating potential for the transistors 100 and 101. The filter 15 of FIGURE 1 is shown in FIGURE 4 as an L-C circuit including reactor 105 and capacitor 106. Finally, the sensing circuit 20 of FIGURE 1 is composed of two transistors 107 and 108 with a lead from the base circuit of transistor 108 driving the base of transistor 101. Suitable auxiliary circuitry of a standard variety is then used in combination with transistors 107 and 108 which includes Zener diode 109 connected in series with resistor 100; biasing resistors 111, 112 and 113; coupling capacitor 114; resistor 115; and the voltage divider circuit including resistors 116 and 117 and the potentiometer 118.

In the example shown in FIGURE 4, the switch 12 closes when the output voltage falls below a predetermined threshold and opens when it rises above this threshold plus the hysteresis of the differential amplifier. Clearly, therefore, the switching frequency will be a function of the filters 105 and 106 and the output load. Synchronous switching on could be accomplished by applying a positive pulse signal to the base of transistor 107 or a negative pulse to the base of transistor 108. Larger loads which do not require constant filtered voltage can be connected ahead of the filter inductor 105 to reduce the dimensions of the filter components to improve the form factor.

Although this invention has been described with respect to its preferred embodiments, it should be understood that many variations and modifications will now be obvious to those skilled in the art.

The embodiments of the invention in which an exclusive privilege or property is claimed are defined as follows:

1. A voltage regulator circuit for a first and second D-C voltage source; said voltage regulator circuit comprising a first and second diode having respective anode and cathode terminals, and a switching device having a first and second terminal electrically connectable and insulated from one another responsive to operation of said switch; said first and second D-C sources having respective positive and negative terminals; said voltage regulator having first and second output terminals; said first output terminal connected to said positive terminal of said first D-C source and said anode terminal of said second diode; said negative terminal of said first D-C source connected to said first terminal of said switching device and said anode terminal of said diode; said second output terminal connected to said cathode terminal of said first diode and said negative terminal of said second D-C source; said positive terminal of said second D-C source connected to said second terminal of said switching device and said cathode terminal of said second diode.

2. The device as set forth in claim 1 which includes a filter circuit connected betwen said first and second output terminals.

3. The device as set forth in claim 1 wherein said first and second voltage sources comprise batteries.

4. The device as set forth in claim 1 which includes synchronous operating means for synchronously closing said switching device for a predetermined length of time and voltage output measuring means connected to said synchronously operating means for controlling the length of time said switch remains closed to maintain a predetermined constant output voltage at said first and second output terminals.

5. The device as set forth in claim 1 which includes a third and fourth D-C voltage source and a second voltage regulator circuit identical to said voltage regulator circuit connected to said third and fourth D-C voltage sources; and auxiliary circuit means for cascading said voltage regulator circuit and said second voltage regulator circuit; said auxiliary circuit means comprising an auxiliary switching device similar to said switching device and third and fourth diode means; said auxiliary switching means and said third and fourth diode means connected to the output terminals of said voltage regulator circuits in a manner identical to the connection of said first and second D-C sources with said switching means and first and second diodes.

References Cited

UNITED STATES PATENTS

| | | | |
|---|---|---|---|
| 2,033,070 | 3/1936 | Hanley | 307—71 X |
| 3,213,287 | 10/1965 | King | 307—71 |
| 3,384,758 | 5/1968 | Keley | 307—77 |

ROBERT K. SCHAEFER, Primary Examiner

H. J. HOHAUSER, Assistant Examiner

U.S. Cl. X.R.

307—77

PO-1050
(5/69)

UNITED STATES PATENT OFFICE
CERTIFICATE OF CORRECTION

Patent No. 3,459,957           Dated August 5, 1969

Inventor(s) T. R. Kelley

It is certified that error appears in the above-identified patent and that said Letters Patent are hereby corrected as shown below:

Column 2, lines 58 and 59 respectively, change "anode" to --cathode-- and change "cathode" to --anode--.

SIGNED AND
SEALED

OCT 28 1969

(SEAL)
Attest:

Edward M. Fletcher, Jr.
Attesting Officer

WILLIAM E. SCHUYLER, JR.
Commissioner of Patents